Nov. 10, 1953   A. WOLMAN ET AL   2,658,202
SANITARY WASTE TREATMENT AND DISPOSAL FOR VEHICLES
Filed Sept. 29, 1948                              3 Sheets-Sheet 1

INVENTORS.
ABEL WOLMAN
WILLIAM A. HAZLETT
BY Joseph L. Baldwin, atty.

Nov. 10, 1953         A. WOLMAN ET AL         2,658,202
SANITARY WASTE TREATMENT AND DISPOSAL FOR VEHICLES
Filed Sept. 29, 1948                    3 Sheets-Sheet 2

INVENTORS.
ABEL WOLMAN
WILLIAM A. HAZLETT
BY

INVENTORS.
ABEL WOLMAN
WILLIAM A. HAZLETT
BY

Patented Nov. 10, 1953

2,658,202

UNITED STATES PATENT OFFICE 2,658,202

SANITARY WASTE TREATMENT AND DISPOSAL FOR VEHICLES

Abel Wolman and William A. Hazlett,
Baltimore, Md.

Application September 29, 1948, Serial No. 51,692

8 Claims. (Cl. 4—8)

Our invention relates to improved apparatus for and improved method of treating and disposing of sewage or toilet wastes from railway cars, airplanes, buses or other passenger-carrying vehicles.

It has long been recognized that it is undesirable to discharge toilet wastes from passenger-carrying vehicles in cities or congested areas. It is desirable for vehicle toilets to be available for use by passengers at all times including the time when a vehicle is at rest in a station. It is particularly desirable for toilet wastes of passenger-carrying vehicles to be so treated as to be pathogenically harmless prior to discharge from the vehicle to the atmosphere or to the earth. In congested areas where towns and villages are relatively close together, it is not only desirable for the discharged material to be pathogenically harmless, but it is also desirable for the waste matter to be macerated or ground and dispersed over a wide area in small particles so as to be inconspicuous and inoffensive to the sight, olfactory and aesthetic sensibilities of people.

Our invention embodies a practical, sanitary and effective apparatus for and method of disposing of toilet wastes from railway cars and other passenger-carrying vehicles.

One object of the present invention is to treat the toilet wastes of a vehicle in such a manner that they are pathogenically harmless prior to discharge from the vehicle to the atmosphere or to the earth.

Another object of the invention is to so control the discharge of the treated wastes that there is no discharge from the vehicle until the waste matter has been suitably treated in such a manner as to render it pathogenically harmless, and also there is no discharge of the pathogenically harmless wastes until or unless the vehicle is moving at or above a predetermined rate of speed.

A further object is to reduce the particle size of the waste material in such a manner that it is both inconspicuous and innocuous when discharged.

A still further object is to provide means for recirculating ground wastes through a grinder or macerating machine so as to further reduce the macerated wastes to finer size prior to disinfection and discharge.

Another object of the invention is to control the discharge of treated wastes from a vehicle, the discharge being controlled by both the temperature of the treated wastes and also by the speed of the vehicle.

A further object of the invention is to provide means for dispersing treated wastes or sewage so that the discharged sewage is dispersed over a wide area and is inoffensive and inconspicuous.

A still further object is to provide means for making the toilet or toilets of a vehicle available for use by passengers at all times regardless of whether the vehicle is at rest or in motion.

Further objects and advantages will become apparent as the disclosure proceeds and the description is read in conjunction with the accompanying drawings in which:

Fig. 1 is a view, partly in vertical cross section, of a preferred form of our invention, showing means for grinding toilet wastes to small particles, means for storing an accumulation of flushed toilet wastes, means for heating toilet wastes so as to render same pathogenically harmless, and means for controlling the discharge of treated toilet wastes from the vehicle to the atmosphere or to the earth.

In Fig. 8 pipes and valves are provided for permitting recirculation of toilet wastes through the grinder.

Similar reference numerals refer to similar parts throughout the drawings.

Figure 1:
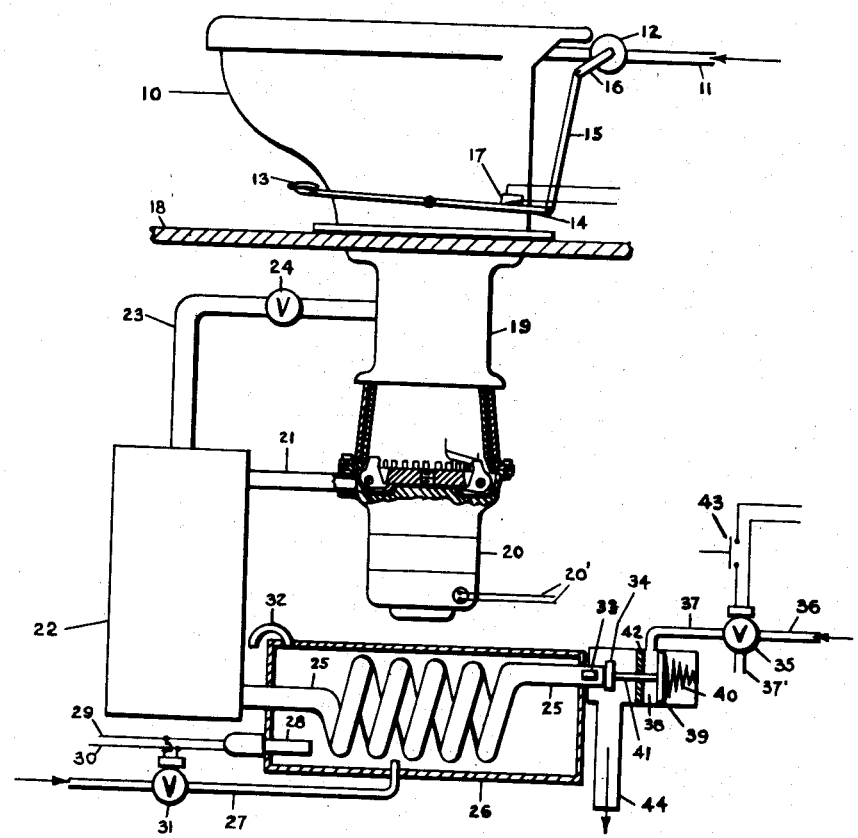

As shown in Fig. 1 of the drawings, 10 indicates a railway toilet hopper connected to a source of flushing water by means of a pipe 11, having in its line a flushing valve 12, which is actuated in a well-known manner by depressing the flushing pedal 13, and shifting the pivoted arms 14, 15 and 16, in such a manner as to open the flushing valve. When the toilet hopper is flushed, a mercury switch 17 is closed for the duration of the flush. It is understood that any other suitable type of electrical switch could be used. The function of the switch 17 will be more fully described hereinafter.

The floor of the vehicle is indicated by 18. A grinder or macerating machine 19, which may be of the type shown by U. S. Letters Patent to J. H. Powers, No. 2,322,058, issued on June 15, 1943, is connected to the lower end of the hopper by suitable leak proof connections. The detail structure of the grinding chamber and grinder forms no part of the present invention, and other well-known types of grinding or macerating machines could be connected to the lower end of the hopper and arranged to automatically grind the flushed toilet wastes to small particles. The grinding machine is operated by a motor 20, connected to a suitable source of electrical energy by the wires 20'.

From the grinder which also functions as a centrifugal pump and assists the gravity flow of the flushed macerated material, the toilet wastes flow through the pipe 21, to a storage tank 22.

Although the detail is not shown in the drawings, we contemplate that pipe 21 can extend down in storage tank 22 so that the ground sewage flows into tank 22 at a point near the bottom of tank 22, or other suitable means can be provided for imparting a swirling motion to the flowing sewage to prevent the tendency of small solid particles to settle in the bottom of tank 22.

The storage tank 22 is made of a suitable capacity to hold a sufficient number of flushes to permit use of the toilet during the periods when the vehicle is standing in a station or passing through cities, at which time discharge of wastes from the vehicle is not desirable. The storage tank 22 has a vent line 23 connecting the upper end of the storage tank to the space above the impeller of the grinder. A normally open valve 24 is provided in the vent line 23. The vent line 23 serves as a means of venting air from the storage tank 22. When the tank is being filled with ground wastes, flowing from the grinder, the valve 24 can be closed during the grinding cycle and grinder pressure assists gravity flow and prevents clogging.

At the lower end of the storage tank 22, a conduit 25 carries the ground toilet wastes into a heating chamber 26. As shown in Fig. 1 of the drawings, the conduit 25 is preferably coiled within the heating chamber 26 in order to increase the quantity of wastes which can be simultaneously disinfected by means of heat treatment in the heating chamber 26. In the heating chamber 26 the wastes within the coil are heated by means of a water bath to which heat is supplied by either steam coming from a suitable source through steam pipe 27, and/or an immersion type electric heater 28, located within the heating chamber 26 and arranged to add heat to the water bath. The electric heater 28 is connected to a source of power by the wires 29 and 30. The flow of steam through the steam pipe 27 is controlled automatically by an electrically operated valve 31. The heating chamber 26 is provided with an overflow vent 32. In a manner which will be explained more fully below, the temperature of the water bath of the heating chamber 26 is controlled by a thermostat 33, which is placed so as to be responsive to the temperature of the heated, ground wastes in conduit 25 near the discharge valve.

Outwardly of the heating chamber 26, the conduit 25 is provided with a normally closed discharge valve 34, so constructed as to be clog-proof.

The opening of the discharge valve 34 is partly controlled by the temperature sensitive thermostat 33, which activates electrically operated valve 35, the opening of which allows air pressure from a suitable source of compressed air to come through air line 36, valve 35, and air line 37, into valve control chamber 38 and force piston 39 to the right in Fig. 1, against the action of spring 40, a spring which normally holds discharge valve 34 in closed position. The piston 39 is connected to a piston rod 41, which passes through wall 42 of valve control chamber 38, the opposite end of the piston rod 41 being connected to discharge valve 34. When the three way valve 35 shuts off the supply of compressed air to air line 37, the air in valve chamber 38 is vented through vent line 37' in a well known manner as spring 40 moves piston 39 to the left in Fig. 1 during the operation which closes discharge valve 34.

In addition to being controlled by the thermostat 33, which is responsive to the temperature of the ground, heat disinfected toilet wastes in conduit 25, the opening of discharge valve 34 is also subject to the control of speed sensitive switch 43. As will be explained more fully hereinafter, the controls are so arranged that the discharge valve 34 will not open unless the ground toilet wastes have been sufficiently heated to be disinfected and rendered pathogenically harmless, and even when so heated, the discharge valve 34 will not open to permit discharge of the treated wastes unless the vehicle is moving at or above a predetermined rate of speed, in which event the switch 43 will be in closed position.

When the discharge valve 34 is open, the heat disinfected, small particles of waste flow through the outlet pipe 44, and are discharged to the atmosphere or to the earth.

Figures 2, 3:
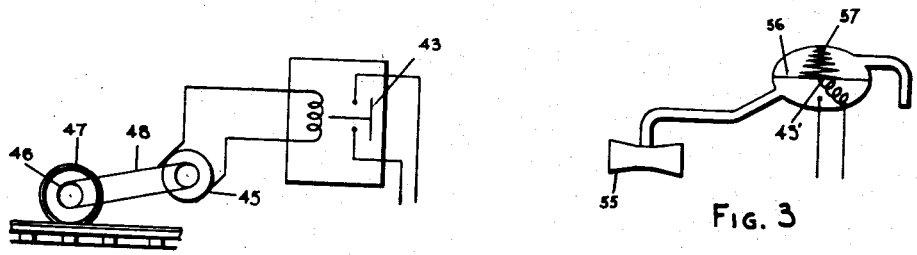
Fig. 2 is a diagrammatic view showing a preferred arrangement for controlling a switch which allows opening of the discharge valve only when the vehicle is moving at or above a predetermined rate of speed.
Fig. 3 shows a modified arrangement for controlling the speed responsive switch shown in Fig. 2.

In Fig. 2 of the drawings we diagrammatically show a preferred arrangement for controlling the speed sensitive switch 43. This speed sensitive switch allows opening of the discharge valve 34 only when the vehicle is moving at or above a predetermined rate of speed. As shown in Fig. 2, the car generator 45 is driven by the axle 46 of a railway car wheel 47 through the medium of belt 48. The generator is so adjusted that when it is rotating at some predetermined speed as a result of motion of the railway vehicle, it generates enough voltage to pull the switch 43 to closed position. When the vehicle is at rest or when the speed of the vehicle is below the predetermined speed, the speed sensitive switch 43 is in open position at which times there can be no opening of the discharge valve 34, as will be fully explained in connection with the description of the electrical circuits shown in Fig. 4 of the drawings.

The arrangement and operation of the speed sensitive switch 43, as shown in Fig. 2, is similar to well-known arrangements for closing a switch to allow the battery of a railway car to be charged.

Figure 4:
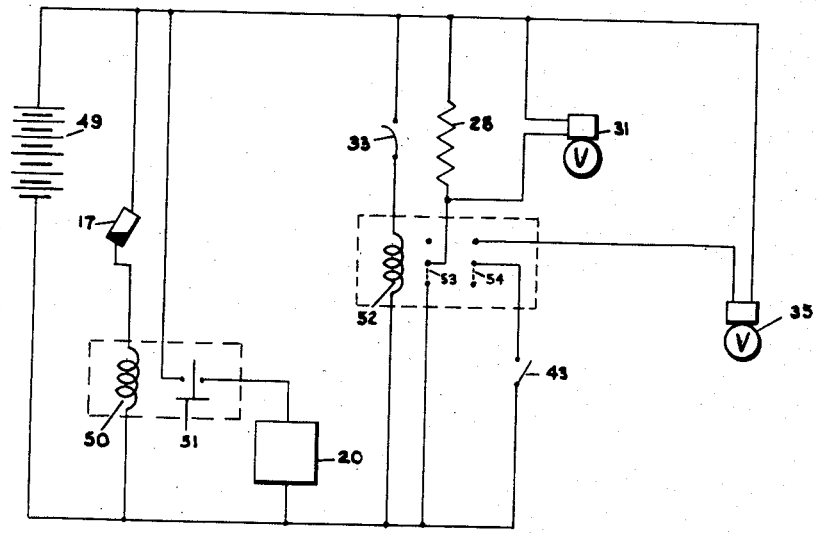
Fig. 4 is a diagram of the electrical circuits for controlling the operation of the apparatus shown in Fig. 1.

Referring to Fig. 4, which is a diagram of the electrical circuits for controlling the operation of the sanitary waste treatment and disposal for vehicles shown in Fig. 1, when the toilet is flushed by depressing the flushing pedal 13, shown in Fig. 1, the switch 17 is closed for the duration of the flush. The closing of switch 17 applies voltage from a battery 49 or other suitable source of electrical energy to a relay 50, and closes the relay contacts 51, which close the grinder circuit and start the grinder motor 20. The relay 50 may be a simple one which runs the grinder motor only for the duration of the flush, or it may incorporate well-known timing devices, not shown in Fig. 4, which will allow the grinder to run for a predetermined time regardless of the duration of the flush.

The normally open thermostat 33 is located within the conduit 25 near the discharge valve 34, as shown in Fig. 1. When the ground or macerated toilet wastes or sewage are below a certain predetermined temperature, the thermostat 33 is open. When the thermostat 33 is open, as shown in Fig. 4, the relay 52 is not energized and the normally closed contacts 53 supply voltage to the electric immersion type heater 28 and/or to the electrically operated valve 31 which admits steam to the water bath of heating chamber 26. The immersion type electric heater 28 and the line for admitting steam to heating chamber 26, are shown in Fig. 1.

When the macerated wastes in conduit 25 reach a predetermined temperature, which is approximately 170° F., the thermostat 33 will close and energize the relay 52. The energization of relay 52 opens the normally closed contacts 53 and turns off the electric immersion heater 28, and/or closes the electrically operated valve 31 to shut off the supply of steam to the hot water bath in heating chamber 26. At the same time a second set of contacts 54 of relay 52 will close, and supply voltage to electrically operated valve 35, provided the speed sensitive switch 43 is in closed position. The valve 35 is an air valve which opens when energized and opens the discharge valve 34 in a manner heretofore described in connection with the description of Fig. 1. As previously explained, the switch 43 is a speed sensitive switch which is closed only when the vehicle is traveling at or above a predetermined rate of speed. When the vehicle is moving below the predetermined speed, the switch 43 is open and the electrically operated valve 35 cannot be energized to admit air and move the discharge valve 34 to open position. The discharge valve 34 will never be moved to open position unless the speed sensitive switch 43 is closed as a result of movement of the vehicle at or above a certain predetermined rate of speed and unless the macerated toilet wastes have been heated to a predetermined temperature sufficient to render same pathogenically harmless. With this arrangement there can never be any discharge of toilet wastes when the vehicle is at rest or when the vehicle is moving slowly through towns or cities; and also there can never be any discharge of the toilet wastes or sewage until the wastes have been sufficiently disinfected by heat treatment to render same pathogenically harmless.

The modified arrangement shown in Fig. 3 for controlling the speed sensitive switch 43, includes a venturi 55 placed on the railroad car, airplane, or other passenger-carrying vehicle, in such a location that the slip stream of air will pass through the venturi 55 regardless of the direction of movement of the vehicle and cause a vacuum to be created underneath a flexible diaphragm 56 and close a speed sensitive switch 43'. When the vehicle is at rest, a spring 57 holds the switch 43' in open position and thereby prevents the opening of the discharge valve 34 in a manner similar to the operation of the speed sensitive switch 43 shown and described in connection with Fig. 1 and Fig. 4.

Figure 5:
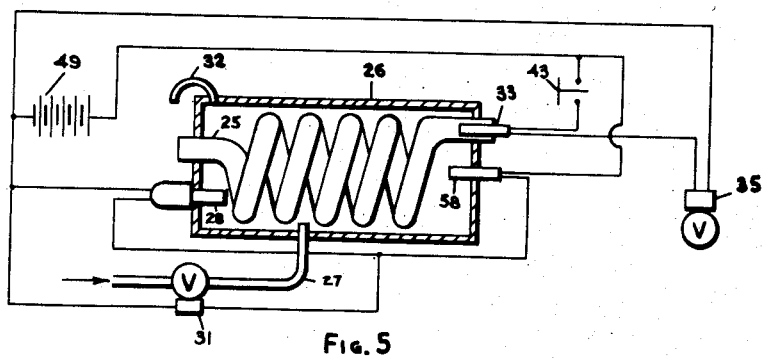
Fig. 5 is a view, partly in cross section, of a modified arrangement of the heat treatment tank shown in Fig. 1. In the arrangement shown in Fig. 5, one thermostat is responsive to the bath temperature and controls the supply of heat to the water bath; and a separate thermostat, responsive to the temperature of the treated waste, is associated with the control for the discharge valve.

In Fig. 5 of the drawings we show a modified arrangement which includes a separate thermostat 58, responsive to the temperature of the water bath, for controlling the admission of heat to the heating chamber 26. As shown in Fig. 5, the thermostat 33 is responsive to the temperature of the macerated wastes near the outlet of conduit 25, and this thermostat 33 actuates the electrically operated valve 35 to control the opening of the discharge valve 34 as shown in Fig. 1, provided the speed sensitive switch 43 is in closed position. The second thermostat 58, which is shown in Fig. 5, is located in the water bath of heating chamber 26, and the thermostat 58 is responsive to the temperature of the water bath. When the water bath is below a predetermined temperature, the thermostat 58 closes an electric circuit and causes heat to be added to the water bath by means of the electric immersion type heater 28, and/or by the admission of steam to the water bath through electrically operated valve 31, and steam pipe 27. When the water bath is at a sufficiently high temperature, the thermostat 58 opens and cuts off the electric immersion type heater 28, and/or shuts off the flow of steam through the steam pipe 27.

Figure 6:
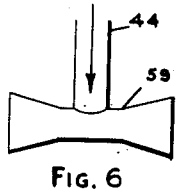
Fig. 6 shows a preferred Venturi outlet to be connected to the discharge pipe shown in Fig. 1 for dispersing the treated toilet wastes when discharged from the vehicle.

Fig. 6 illustrates a Venturi outlet 59 for dispersing the pathogenically harmless wastes over a wide area. It is desirable for passenger-carrying vehicles, which are in service in sections of the country having a high density of population, to be provided with means for dispersing the wastes over a wide area so that the discharged sewage is inoffensive to the sight or aesthetic sensibilities of people. The venturi 59 of Fig. 6 is adapted to be connected to the outlet pipe 44, shown in Fig. 1 of the drawings. Upon opening of the discharge valve 34, the heat treated particles of waste fall vertically through pipe 44 into the throat of the venturi through which air is passing because there will be no opening of the discharge valve 34 unless the vehicle is traveling at or above a predetermined speed. The small particles of heat treated wastes are mixed with the air in the venturi and are further broken into smaller droplets or particles and are dispersed over a wide area. This Venturi arrangement is an effective dispersing means regardless of the direction of movement of the vehicle.

Figure 7:
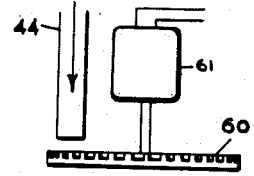
Fig. 7 is a view of a modified arrangement of the dispersing apparatus.

The modified apparatus for dispersing shown in Fig. 7 includes a grooved disc 60, which is rotated by means of an electric motor 61 connected to a suitable source of electrical energy. The wastes being discharged through the outlet pipe 44 fall upon the rotating, grooved disc 60 and are dispersed over a wide area by means of centrifugal force.

Figure 8:
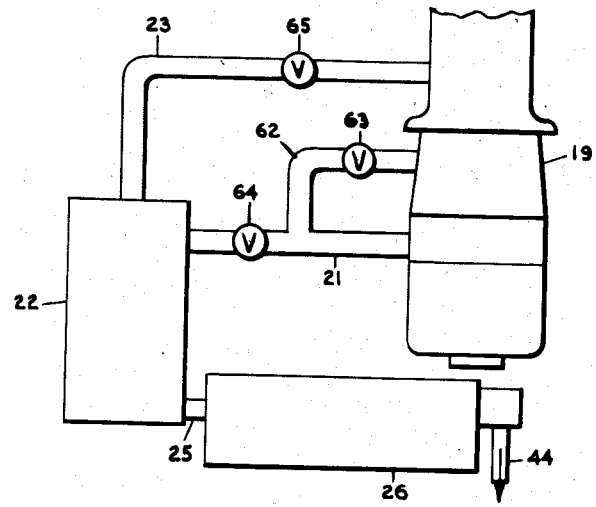
Fig. 8 is a schematic view of a modified arrangement of the waste treating apparatus shown in Fig. 1.

The modified arrangement of the waste treating apparatus shown in Fig. 8 includes means for automatically providing for the recirculation of flushed, macerated toilet wastes through the grinder 19. The provision for recirculation of the wastes through the grinder has the advantage of using all of the liquids flushed into the grinder to flush the sewage through the grinder during the recirculation period and grind the wastes to even smaller particles.

The grinder 19 of Fig. 8 is connected to the toilet hopper by suitable air-tight and leak-proof connections, the hopper not being shown in Fig. 8. The pipe or conduit 21 through which the ground wastes pass from the grinder chamber to the storage tank 22 has a recirculation pipe 62 connected to the grinder chamber. The recirculation pipe 62 has in its line an electrically operated valve 63 adapted to control the flow of reflushed, macerated toilet wastes through the recirculation pipe 62. Between the connection of recirculation pipe 62 to pipe 21, and storage tank 22, as shown in Fig. 8 of the drawings, there is an electrically operated valve 64 adapted to shut off flow of material from the grinder 19 to the storage tank 22 during the recirculation cycle. An electrically operated valve 65 is located in vent line 23. The valve 65 is adapted to close the vent line between the storage tank 22 and the grinder 19 during the flow of ground waste into the tank 22 at the end of the recirculation cycle. At the end of the recirculation cycle the electrically operated valves 63 and 65 will close and the electrically operated valve 64 will open before the grinder stops. The ground, macerated wastes are then forced under grinder pressure to the storage tank 22. The valve 65 in the vent line being closed at this time when the material is flowing and/or being pumped by the grinder to storage tank 22, pressure is built up in the storage tank 22 which will force the material into and through conduit 25 in case of clogging. At the end of the grinding cycle, the grinder motor stops and valves 63 and 65 move to open position.

Thus the ground waste material flows from the storage tank 22 to the conduit 25 by both gravity and by the pressure built up in the tank 22 during the period of the grinding cycle when valves 63 and 65 are closed and valve 64 is open and the ground material is flowing from the grinder 19 to the storage tank 22.

If desired, the valve 24 shown in the vent line 23 of Fig. 1, can similarly be closed during the grinding cycle so as to cause pressure to be built up in tank 22 which assists the gravity flow of the material. This pressure forces any clogged material out of conduit 25 when the hereinbefore described controls have moved the discharge valve 34 to open position.

Figure 9:
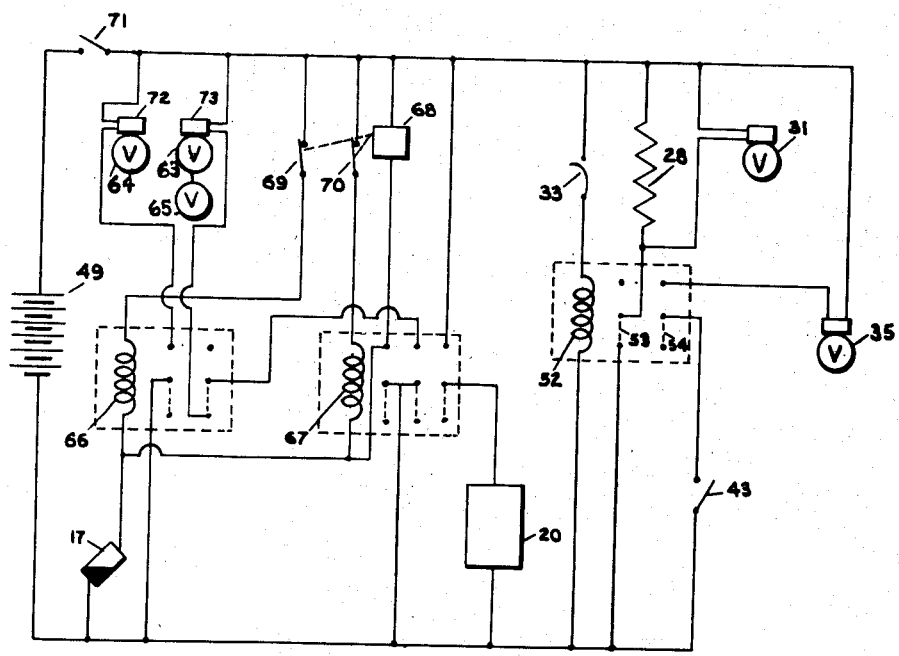
Fig. 9 is a diagram of the electrical circuits for controlling the operation of the apparatus shown in Fig. 8.

Preferably, the valves 63, 64 and 65 shown in Figs. 8 and 9, are air-operated valves of the rubber sphincter type which are opened and closed by the operation of solenoids. Fig. 9 of the drawings diagrammatically shows solenoid 72 which controls the opening and closing of valve 64. The valve 64 is located in pipe 21 as shown in Fig. 8. Fig. 9 also diagrammatically shows solenoid 73 which controls the opening and closing of valves 63 and 65. As shown in Fig. 8, valve 63 is located in recirculation pipe 62; and valve 65 is located in vent line 23. The operation of the valve controls and valves will be described below in connection with the description of electrical circuits shown in Fig. 9 of the drawings. With the arrangement shown in Fig. 8 and Fig. 9, when valve 64 has closed pipe 21 and stopped flow of material from the grinder to the storage tank 22; and valves 63 and 65 are in open position, the operation of the grinder pumps the flushed toilet waste through the recirculation pipe 62 back to the grinder and regrinds the waste to finer particles during the recirculation cycle.

In Fig. 9, we show the electric circuits for controlling the operation of the modified arrangement shown in Fig. 8 which embodies the recirculation feature. As illustrated in Fig. 9, upon the closing of the flush-operated switch 17, relays 66 and 67 are energized and timer 68 is started. The left set of contacts of relay 67 bypass switch 17 so that relays 66 and 67 and timer 68 continue to be energized by the source of electrical energy 49, after the flush-operated switch 17 is opened. Relay 66 actuates the solenoid 72, which closes valve 64 in pipe 21. The valve 63 in recirculation pipe 62, and the valve 65 in vent line 23, are open when valve 64 is in closed position. The grinder motor 20 is started by relay 67. At the end of a predetermined time interval, preferably about 10 seconds, the timer 68 opens the normally closed switch 69 which deenergizes relay 66, and actuates solenoid 72 which opens valve 64. At the same time solenoid 73 closes the valve 63 in recirculation pipe 62 and closes the valve 65 in vent line 23. The closing of the valves 63 and 65 allows the grinder to pump the flushed, macerated toilet wastes through pipe 21 to storage tank 22, under pressure without further recirculation through the recirculation pipe 62. After a second predetermined time interval of approximately five additional seconds, the timer 68 opens normally closed switch 70 which deenergizes relay 67 and stops the operation of the grinder motor 20 and timer 68 and causes solenoid 73 to open the valve 63 in recirculation pipe 62 and to open the valve 65 in vent line 23.

A circuit breaker, which is normally closed, is shown at 71.

The additional circuits shown at the right side of Fig. 9, illustrate the heating and discharge controls which are identical with the control circuits shown in Fig. 4 and described hereinbefore. It is not necessary to repeat the description of these circuits and controls because their operation in the recirculating arrangement of Fig. 9 is similar to their operation previously described in connection with Fig. 4.

In Fig. 1 and Fig. 5 of the drawings we have shown the heating chamber 26 provided with both an electric immersion type heater 28 and also a steam line 27 for furnishing heat to the water bath in heating chamber 26 to disinfect the toilet wastes in the conduit 25. It is understood that both the electric and steam heating means can be used simultaneously, or either of these heating means could be used independently to heat the toilet wastes to the desired temperature.

Tests have shown that the ground and macerated toilet wastes become pathogenically harmless when heated to a temperature of 160° F. As a safety factor we prefer to adjust the controls so that the wastes or sewage in conduit 25 are heated to a temperature of approximately 170° F. However, if future knowledge of proper disinfection should indicate that it is desirable to heat the wastes to a higher temperature prior to discharge, the controls could be so adjusted that the wastes or sewage in conduit 25 would be heated to a suitable temperature above 170° F. prior to discharge.

It is obvious that the flushed toilet wastes pass through the grinder 19, tank 22 and heating chamber 26 together with the flushing water. If it is desired, the flushing valve 12 can be adjusted so that it supplies a continuous flow of water during the operation of the grinder 19; or a separate water line, not shown in the drawings, could automatically supply a continuous trickle of water to the chamber of the grinder 19 for the duration of the operation of the grinder.

While we have described the grinder 19 as secured to the lower end of the toilet hopper 10 by suitable air-tight and leak-proof connections, it is understood that the toilet hopper and grinder could be manufactured as one integral unit.

The fact that the toilet wastes are ground or macerated to very small particles not only makes the ultimately discharged material inoffensive and inconspicuous, but also facilitates the disinfection by heat treatment as the finely ground particles of sewage are heated, and thereby disinfected in heating chamber 26.

Our improved apparatus for and method of treating and disposing of toilet wastes for vehicles operates so as to provide means for flushing toilet hoppers in the usual manner, the flushed wastes flowing from the hopper 10 to the grinder 19 where the material is ground or macerated into small particles. As shown in the modified arrangement of Fig. 8 and Fig. 9, the flushed wastes may be ground to even smaller particles by recirculating the material through recirculation pipe 62 and back to the grinder 19. From the grinder the macerated wastes flow to storage tank 22 which is of a sufficient capacity to hold a number of flushes and permit use of the vehicle toilet when the vehicle is at rest in a station at which times the discharge valve 34 is always closed as previously described. From the storage tank 22 the ground or macerated wastes enter conduit 25 which carries the material into the coil located in heating chamber 26 where the ground wastes are heated to a sufficient temperature to disinfect the wastes and render same pathogenically harmless prior to opening of the discharge valve 34. The discharge valve 34 will not open and permit the macerated, pathogenically harmless wastes to be discharged unless the speed sensitive switch 43 is in closed position as a result of the movement of the vehicle at or above a predetermined rate of speed. Also, as soon as wastes which have not been heated to the desired temperature reach the thermostat 33 near the outlet of conduit 25, the discharge valve 34 will automatically close and prevent the discharge of wastes which are not pathogenically harmless. As shown in Fig. 6 and Fig. 7, the outlet pipe 44 can have connected thereto apparatus for dispersing the macerated, disinfected wastes over a wide area.

The foregoing description of our invention made for the purpose of disclosure and to illustrate the principles involved will suggest various substitutions and changes that may be made under our basic concepts; the right is reserved to all such substitutions and modifications that lie within the scope of the appended claims.

We claim:

1. In a vehicle toilet, the combination of a toilet hopper, a grinder chamber into which the contents of the hopper are discharged, means in the grinder chamber for macerating the wastes received from the toilet hopper, a storage tank into which the macerated wastes pass from the grinder, a heating chamber receiving the macerated wastes from the storage tank, said heating chamber having a normally closed discharge valve and means for heating the macerated wastes to a temperature at which they become pathogenically harmless, a thermostat responsive to the temperature of the heated wastes, means responsive to the speed of the vehicle, said thermostat and said means responsive to the speed of the vehicle being operatively connected to the discharge valve to effect the opening of said discharge valve and permit the discharge of the macerated wastes from the heating chamber only when the wastes are pathogenically harmless and the vehicle is moving at or above a predetermined rate of speed.

2. Apparatus for treating and disposing of vehicle toilet wastes which includes a hopper, a grinder for macerating flushed wastes, a recirculating pipe through which ground wastes recirculate from the grinder back to the grinder and thence to a storage tank, a conduit through which the wastes pass from the storage tank to a heating chamber, means for heating the wastes to a temperature sufficient to render same pathogenically harmless, a discharge valve through which the macerated, heat treated wastes are discharged from the heating chamber to atmosphere, means responsive to the temperature of the heated wastes in the heating chamber, a means responsive to the speed of movement of the vehicle, said heat responsive means and said speed responsive means being operatively connected to the discharge valve to jointly control the operation thereof.

3. Apparatus for treating and disposing of vehicle toilet wastes which includes a hopper, a grinder for macerating wastes flushed from the hopper, a pipe through which wastes flow from the grinder to a storage tank, a vent pipe connecting the storage tank with the grinder, a valve in the vent pipe which can be closed during the grinding cycle whereby pressure is built up in the storage tank, which pressure assists gravity flow of ground wastes from the storage tank to a heating chamber which is connected to the storage tank, heating means within the heating chamber for heating the wastes received from the storage tank, a discharge valve associated with heating chamber through which the heated wastes may be discharged to the atmosphere, said discharge valve being jointly controlled by a means responsive to the temperature of the heated wastes and a means responsive to the speed of movement of the vehicle.

4. Apparatus for treating and disposing of vehicle toilet wastes which includes a hopper, a grinder for macerating flushed wastes, a recirculation pipe through which ground wastes are pumped through the recirculation pipe from the grinder back to the grinder, a pipe leading from the grinder to a storage tank, a conduit through which the wastes pass from the storage tank through a coil located in a water bath heating chamber which includes both steam and electric means for heating the water bath to a desired temperature, whereby the wastes are heated to a temperature sufficient to render the wastes pathogenically harmless, said coil having a discharge valve adapted to open and permit discharge of the macerated heat treated wastes from the vehicle, the discharge valve operating under the joint control of a heat responsive device associated with the heated wastes in the heating chamber, and a device responsive to the speed of movement of the vehicle.

5. Sewage waste treating apparatus for vehicle toilets, comprising a hopper into which the waste is deposited, a storage tank, means connected between the hopper and the storage tank for grinding and macerating the waste before it flows into the storage tank, a conduit through which the waste passes from the storage tank through a heating chamber, said conduit having a normally closed discharge valve and means comprising a waste temperature responsive thermostat and a switch responsive to the speed of the vehicle for effecting the opening of a discharge valve and the discharge of the waste from the heating chamber to an outlet pipe leading to the atmosphere, only when the waste has been rendered pathogenically harmless by heat treatment and the vehicle is moving at or above a predetermined speed.

6. Sewage waste treating apparatus for vehicles comprising a hopper into which the waste is deposited, a grinder operatively connected to said hopper for macerating and forcing the waste into a storage tank, a heating chamber connected with the storage tank to receive and render the macerated waste pathogenically harmless, said heating chamber having a normally closed discharge valve, and means including a thermostat responsive to the temperature of the waste in the heating chamber and a switch responsive to the speed of movement of the vehicle, said means being operatively connected to the discharge valve to move the valve to open position to discharge the treated waste from the vehicle only when the waste has been rendered pathogenically harmless and the vehicle is moving at or above a predetermined speed.

7. A passenger carrying vehicle having a waste treating and disposal apparatus including a chamber for receiving waste flushed from a toilet hopper, said chamber having a normally closed discharge valve, heating means for heating the waste in the chamber, a thermostat associated with said chamber and responsive to the temperature of the heat treated waste, a switch responsive to the speed of movement of the vehicle, said thermostat and said switch being operatively connected with said discharge valve to permit the opening of the discharge valve only after the waste has been rendered pathogenically harmless by heat treatment and the vehicle is moving at or above a predetermined speed.

8. A vehicle for passengers having sewage waste treating apparatus comprising a hopper into which the waste is deposited, a macerating means connected with the hopper for macerating and forcing the waste into a storage tank, a conduit through which the waste passes from the storage tank through a heating chamber, said conduit having a normally closed discharge valve, means responsive to the temperature of the heated waste in the conduit, a second means responsive to the speed of the vehicle, said heat responsive means and said speed responsive means being operatively connected to the discharge valve to cause the discharge valve to open and permit discharge of the waste from the vehicle only when the temperature of the waste is at or above a predetermined degree and the vehicle is moving at or above a predetermined speed.

ABEL WOLMAN.
WILLIAM A. HAZLETT.

References Cited in the file of this patent

UNITED STATES PATENTS

| Number | Name | Date |
|---|---|---|
| 1,293,141 | McGary | Feb. 4, 1919 |
| 1,423,953 | Frank | July 18, 1922 |
| 1,530,789 | Scott | Mar. 24, 1925 |
| 1,845,277 | Hurlburt | Feb. 16, 1932 |
| 1,996,325 | Cox | Apr. 2, 1935 |
| 2,131,711 | Porteous | Sept. 27, 1938 |
| 2,279,578 | Martin | Apr. 14, 1942 |
| 2,435,845 | Rice | Feb. 10, 1948 |
| 2,514,040 | Eksergian | July 4, 1950 |
| 2,549,575 | Conley | Apr. 17, 1951 |